United States Patent Office 3,309,207
Patented Mar. 14, 1967

3,309,207
PRECOOKED DEHYDRATED VEGETABLE CASSEROLE AND METHOD OF MAKING SAME
Justin M. Tuomy, Framingham, Mass., and Rosario Buscemi, Niles, Ill., assignors to the United States of America as represented by the Secretary of the Army
No Drawing. Filed Oct. 30, 1963, Ser. No. 320,229
9 Claims. (Cl. 99—207)

The invention described herein, if patented, may be manufactured and used by or for the Government for governmental purposes without the payment to us of any royalty thereon.

This invention relates to freeze-vacuum dehydrated foods and more particularly to a freeze-vacuum dehydrated vegetable casserole meal that can be rapidly rehydrated with either hot or cold water.

Freeze dehydration is a technique whereby food items in the raw or cooked state are frozen and then subjected to a low pressure or vacuum of the order of 750 to 1,000 microns of mercury to remove water present as ice by sublimation. Food items are normally dehydrated to a moisture content of less than 4% and when suitably packaged in a moisture impermeable container in the absence of oxygen are storage stable for long periods of time without any deterioration in quality. As compared with conventional thermal processing, freeze-vacuum dehydrated products are lighter in weight and when rehydrated have taste, color and texture essentially that of the fresh product.

The extension of this technique to more food items and especially to pre-cooked convenience items has not been possible because experience has shown that such items cannot be satisfactorily rehydrated. It is known that many cooked food items particularly those where there is some alteration of the physical structure of the component, as for example by comminuting, dicing, slicing, etc., are difficult to rehydrate even with hot water within a reasonable time, i.e., less than 15 minutes. It is believed that this difficulty stems in part from the absence in the dehydrated product of sufficient pathways of rehydration along which water can be transported or wicked so as to reach all parts of the product.

There is currently a need for a freeze-vacuum dehydrated precooked vegetable or vegetable and meat combination meal, such as casserole meals, both as a convenience item for civilian consumption and as a quick service hot meal for military consumption. Especially desirable are combination meals such as escalloped potatoes, with or without meat, which, aside from being highly nutritious, have a wide consumer acceptance.

To be suitable as a military ration it is a requirement that the freeze-vacuum dehydrated item be completely rehydratable using cold water (below 160° F.) within a reasonable time. This requirement is dictated by the fact that it will not often be possible in the field to obtain hot water (at or near 212° F.) to accomplish the rehydration. One such instance occurs in aircraft required to remain aloft for rather extended periods during which it is desired to relieve the tedium of the flight by serving the crew a hot meal. At altitudes in the vicinity of 30,000 feet in an unpressurized cabin it is not possible to heat water above 160° F. If a dehydrated ration would satisfactorily rehydrate with water at this temperature then it would be possible to serve a palatable, warm meal. In addition, such rations would be of extraordinary value if they could be eaten dry under conditions of extreme stress where for some reason it would be impossible to rehydrate the rations. Palatability of the dried item depends on the rapidity with which the item can rehydrate in the mouth so as to approximate in taste and texture a familiar food substance.

Heretofore, attempts to produce a precooked, freeze-vacuum dehydrated casserole dish such as escalloped potatoes or escalloped potatoes and meat were unsuccessful. Products prepared according to customary cooking and freeze-dehydration techniques produced a product that rehydrated slowly and incompletely in hot water, negligibly in cold water and was completely unsuitable as a dry ration. Attempts to overcome the problem of rehydration by variation in cooking techniques, manipulation of piece size, amount and types of spices, addition of fillers such as sauces were of no avail.

We have discovered that the addition of from about 3% to about 10% by weight of pregelatinized corn flour to the casserole ingredients prior to cooking results in a product which when freeze-vacuum dehydrated is capable of rapid rehydration with cold water and the addition of which does not alter the color, flavor or appearance of the reconstituted item so as to affect acceptance.

Accordingly, it is an object of our invention to provide a precooked dehydrated casserole meal which will resemble the original cooked product in taste, color and texture after rehydration.

Another object is to provide a precooked dehydrated casserole meal that will rehydrate substantially instantaneously in either hot or cold water.

A further object is to provide a precooked dehydrated casserole meal that is acceptable when eaten in dry form.

Still another object is the production of a precooked dehydrated casserole meal which, when properly protected from oxygen and moisture in storage, will maintain their consumer acceptability under adverse storage conditions.

A further object is the provision of a variety of precooked dehydrated casserole meals that can be varied as to content, and cast into blocks of a size convenient for packaging and which can be rapidly and completely rehydrated.

Other objects and advantages of our invention will be readily apparent from the following description.

As pointed out, our invention resides in the discovery that the addition of a minor amount of pregelatinized corn flour to the ingredients of the casserole meal results in a product that is capable of rapid rehydration in either hot or cold water. Without the pregelatinized corn flour all attempts to produce a freeze dried casserole dish have resulted in a product that rehydrates slowly and incompletely even in hot water.

The precooked, dehydrated vegetable casserole meals of the present invention are prepared by mixing one or more sliced vegetables, e.g. white potatoes, sweet potatoes, squash, etc., diced or ground meat, e.g. pork, ham, beef, lamb, veal, poultry, etc., pregelatinized corn flour, and sufficient liquid for processing. The components are mixed in a proportion of about 40 to 95 parts by weight of the vegetable component, from 0 to 50 parts by weight of the meat component and from 3 to 10 parts by weight of the pregelatinized corn flour.

Within the foregoing broad range, the percentage of the vegetable component is varied according to the end product desired. Meat may or may not be included in the mixture and when included may consist of one or a combination of different types of meat. It has been established that the pregelatinized corn flour must be present in an amount equal to at least 3% by weight of the mixture. When present in an amount greater than 10% by weight the product becomes sticky and undesirable in texture.

The mixture is cooked to the desired stage and then frozen. The frozen product is freeze-vacuum dehydrated until the moisture content is below 4% (preferably below 2%) in accordance with techniques well understood in the art, and finally is canned or otherwise hermetically sealed in a moisture impervious container in the absence of atmospheric oxygen, as for example, in a vacuum or in the presence of an inert gas such as nitrogen or carbon dioxide.

The resulting product is quite storage-stable when packaged in the absence of oxygen and moisture and is completely rehydratable with hot water in a few seconds, and has the flavor, texture and appearance of a freshly cooked product. Rehydration with cold water (e.g. 80° F.) is complete within 5 minutes or less. It is noted that similar freeze dried products processed without the pregelatinized corn flour required more than 20 minutes to rehydrate in hot water.

We will now proceed to disclose several specific examples of our invention. It will be understood that the advantages of our invention can be accomplished by suitable variation of the detailed method steps and formulations, about to be set forth below, which are intended to be for illustrative purposes, and not for the purpose of limiting the scope of the invention.

*Example I.—Precooked dehydrated escalloped potatoes and meat*

This dish is prepared by mixing together in a suitable cooking vessel 10 lbs. of diced lean pork, 15 lbs. of sliced white potatoes and 1½ lbs. of minced onions. 1¾ lbs. pregelatinized corn flour, 1½ lbs. water, 6 oz. salt and 0.2 oz. ground pepper are mixed together to form a slurry which is then intimately mixed with the meat and vegetables. The mixture is baked in an oven at 350° F. for about two hours. The cooked product is cooled, cast into blocks convenient for serving and frozen in a blast freezer to a temperature of the order of 10° F. The frozen blocks are freeze-vacuum dehydrated, in accordance with recognized freeze-vacuum dehydration techniques at a plate temperature of 110° F. and a vacuum of about 750 to 1,000 microns of mercury to a moisture content of about 2%. An inert gas is used to break the vacuum in the chamber and the dehydrated product is hermetically sealed in a can under vacuum. Products prepared in this manner have successfully stored for over one year at temperatures of the order of 100° F. Samples removed after 9 months' storage were found to be completely acceptable in appearance, flavour and texture after rehydration. This product approximately ½" in thickness was found to be completely rehydrated within 2 minutes after the addition of an excess of cold water (150° F.) and to be completely rehydrated within 5 seconds after the addition of an excess of hot water (212° F.).

*Example II.—Precooked dehydrated escalloped potatoes*

There is combined in a mixing vessel 25 lbs. of sliced white potatoes, 2 lbs. of minced onions. A slurry formed of 2 lbs. of pregelatinized corn flour, 2 lbs. of water, ½ lb. of salt and 1 oz. of pepper (ground) is mixed with the vegetables and cooked in a steam jacket kettle until the potatoes test done. The mixture is cooled, frozen and dehydrated as in Example I. The product is storage-stable in hermetically sealed cans containing nitrogen gas. Rehydration is instantaneous upon the addition of hot water (212° F.).

*Example III.—Precooked sweet potato and meat casserole*

14 lbs. of sliced sweet potatoes and 10 lbs. of ground beef are mixed in a suitable vessel. A slurry of pregelatinized corn flour (3 lbs.), 2 lbs. water, ½ lb. salt and 1 oz. pepper is added to the meat and vegetable mixture and cooked until done. The cooked product is cooled, cast into a 4" x 2" log frozen and sawed into ½" slices which are freeze-vacuum dehydrated as in Example I. The dehydrated product is hermetically sealed in a metal container under vacuum. Rehydration is practically instantaneous with hot water and occurs within two minutes with water at room temperature (80° F.).

In lieu of metal containers, freeze dehydrated materials may be packaged in flexible hermetically heat-sealed plastic or metal foil laminated packages.

Pregelatinized corn flour is obtained by subjecting corn meal to the action of heat in the presence of water whereby the cell walls of starch are caused to rupture liberating the starch granules. Pregelatinized corn flour is an available article of commerce. Gelatinization of starch is discussed in "Starch and Its Derivatives," 2nd ed., J. A. Radley, published by Chapman & Hall Ltd., 1943, London.

It will be seen from the foregoing that we have provided a simple and highly efficient method of providing a wide variety of instantly rehydratable, freeze-vacuum dehydrated casserole type dishes that are highly palatable and may be prepared under difficult field conditions and, when necessary, may be consumed without addition of water.

We wish to be understood that departures from the conditions set forth in the foregoing specification will readily occur to the expert and are therefore within the scope of the invention, which we now proceed to define by the appended claims.

We claim:
1. A process of preparing a dehydrated, precooked vegetable casserole meal which comprises
  (a) mixing from 0 to 50 parts by weight of comminuted meat, from 40 to 95 parts by weight of at least one sliced vegetable of the group consisting of white potatoes, sweet potatoes and squash, from 3 to 10% by weight of pregelatinized corn flour, and sufficient liquid for processing,
  (b) cooking said mixture until the ingredients test done,
  (c) freeze-vacuum-dehydrating the cooked mixture to a moisture content below 4%; whereby an instantly rehydratable, storage-stable product is obtained which upon rehydration has the appearance, texture and flavor of the freshly prepared product.
2. A process according to claim 1 wherein said comminuted meat is selected from the group consisting of pork, ham, beef, lamb, veal and poultry.
3. A process according to claim 2 wherein said dehydrated product is packaged in the absence of oxygen.
4. A process according to claim 3 wherein said cooked mixture is dehydrated to a moisture content below 2%.
5. A process according to claim 3 wherein said liquid is water.
6. A process according to claim 3 wherein said sliced vegetable is white potato.
7. A process according to claim 3 wherein said mixture is shaped prior to dehydration into portions convenient for serving.
8. A rapidly rehydratable, precooked, freeze-vacuum dehydrated food product produced according to the process of claim 1.
9. A rapidly rehydratable, precooked, freeze-vacuum dehydrated food product produced according to the process of claim 3.

References Cited by the Examiner

UNITED STATES PATENTS 3,083,108   3/1963   Kline et al. _____ 99—208
3,150,985   9/1964   Buscemi et al. _____ 99—208

A. LOUIS MONACELL, *Primary Examiner.*

J. GOLIAN, M. VOET, *Assistant Examiners.*